United States Patent [19]
Chen

[11] Patent Number: 5,460,455
[45] Date of Patent: Oct. 24, 1995

[54] PEDAL CRANK BEARING ASSEMBLY FOR BICYCLES

[76] Inventor: Yi C. Chen, No. 139-5, An Mei Rd., Mei Shan Village, Hou Li Hsiang, Taichung Hsien, Taiwan

[21] Appl. No.: 273,413

[22] Filed: Jul. 11, 1994

[51] Int. Cl.[6] .................................................. F16C 19/08
[52] U.S. Cl. .................................. 384/458; 384/545
[58] Field of Search .............................. 384/458, 545, 384/538, 540, 541, 542

[56] References Cited

U.S. PATENT DOCUMENTS

| | | | |
|---|---|---|---|
| 4,563,099 | 1/1986 | Brandenstein et al. | 384/458 |
| 4,606,655 | 8/1986 | Hofmann | 384/458 |
| 5,118,205 | 6/1992 | Hoffmann | 384/458 |
| 5,181,437 | 1/1993 | Chi | 384/545 |

*Primary Examiner*—Lenard A. Footland
*Attorney, Agent, or Firm*—Peterson, Wicks, Nemer & Kamrath

[57] ABSTRACT

A pedal crank bearing assembly includes a housing, a tube, two races, two bearings and an axle. The axle is rotatably engaged within the tube by two bearings and at least one bearing is received in an inner side of one of the races which is threadedly engaged to an inner periphery of the housing and the tube is threadedly engaged to an inner periphery of the race. The race has a serrated face defined at an end thereof for engagement to a stop fixed on the tube for preventing the race from rotating.

8 Claims, 3 Drawing Sheets

5,460,455

PEDAL CRANK BEARING ASSEMBLY FOR BICYCLES

BACKGROUND OF THE INVENTION

The present invention relates to a pedal crank bearing assembly, more particularly, to a pedal crank bearing assembly for bicycles, which has first and second races having a threaded end defined in an end periphery thereof threadedly engaged to a tube and a stop is fixed on the tube and engaged to a serrated face of the second race to prevent it from loosening.

A conventional pedal crank bearing assembly is shown in FIG. 1, which includes an axle 10, a tube 20, two caps 31 32 and a housing 30. The axle 10 is rotatably engaged within the tube 20 which has thread portions defined in outer periphery of both ends thereof for engagement with a housing 30 and the caps 31 and 32 are mounted on both ends of the housing for keeping dust from entering. Two bearings 41, 42 are disposed between the axle 10 and the tube 20 to provide a better rotational efficiency. In order to maintain a position of the bearing 42, a race 43, a washer 44 and a nut 45 are threadedly mounted on a thread section 12 of the axle 10. However, as a bicycle often encounters rough and uneven terrain, especially for a mountain bike, the engagement of the housing 30 and the tube 20 tends to loosen and that increases damage occurring between the threading relationship of the housing 30 and the tube 20, and further causes the axle 10 to have a poor operating feature. Furthermore, the bearing assembly could be shocked severely, and in such a situation the nut 45 has a high possibility of loosening from the thread section 12 and that causes an instability of the bearing 42. Another shortcoming is that the procedure to adjust the bearing assembly is complex, whereby a user must disengage the cap 32 first and then he or she has to use a socket tool to unscrew the nut 45.

The present invention intends to provide an improved pedal crank bearing assembly to mitigate and/or obviate the above-mentioned problems.

SUMMARY OF THE INVENTION

The present invention provides a pedal crank bearing assembly including a housing, a tube, two races, two bearings and an axle. The axle is rotatably engaged within the tube by two bearings and at least one bearing is received in an inner side of one of the race which is threadedly engaged to an inner periphery of the housing and the tube is threadedly engaged to an inner periphery of the race. The race has a serrated face defined at an end thereof for engagement to a stop fixed on the tube for preventing the race from rotating.

It is an object of the present invention to provide a pedal crank bearing assembly which has a race threadedly engaged between a housing and a tube thereof.

It is another object of the present invention to provide a pedal crank bearing assembly wherein the race has a threaded end and a stop is fixed on the tube and is engaged to the threaded end of the race for keeping the race from rotating.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
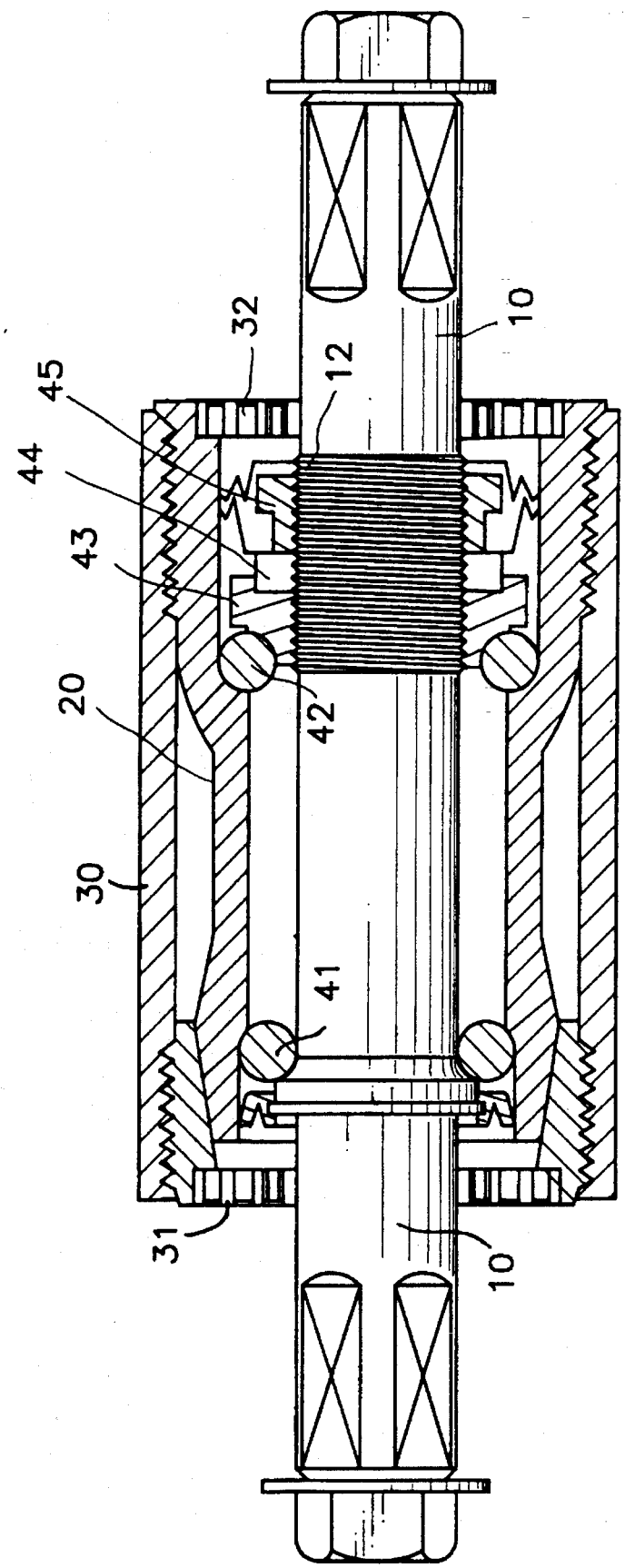
FIG. 1 is a side elevational view, partly in section, of a conventional pedal crank bearing assembly.
Figure 2:
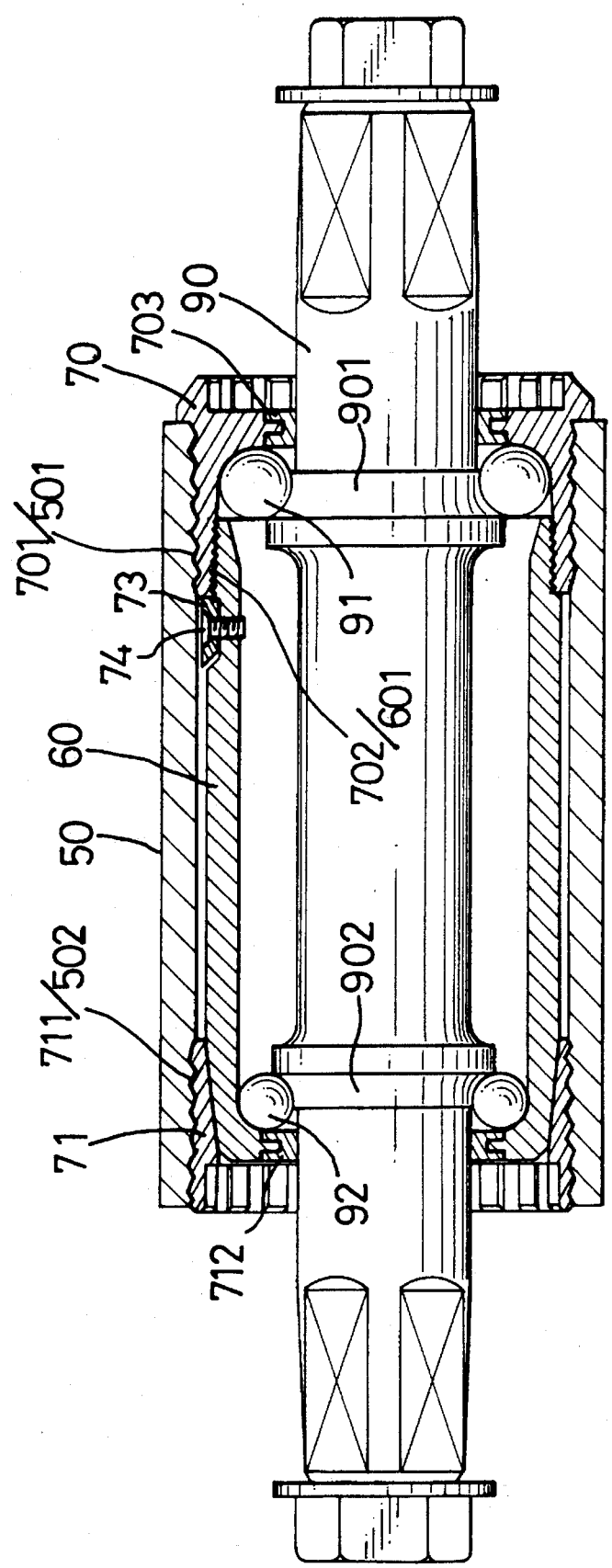
FIG. 2 is a side elevational view, partly in section, of a pedal crank bearing assembly in accordance with the present invention.
Figure 3:
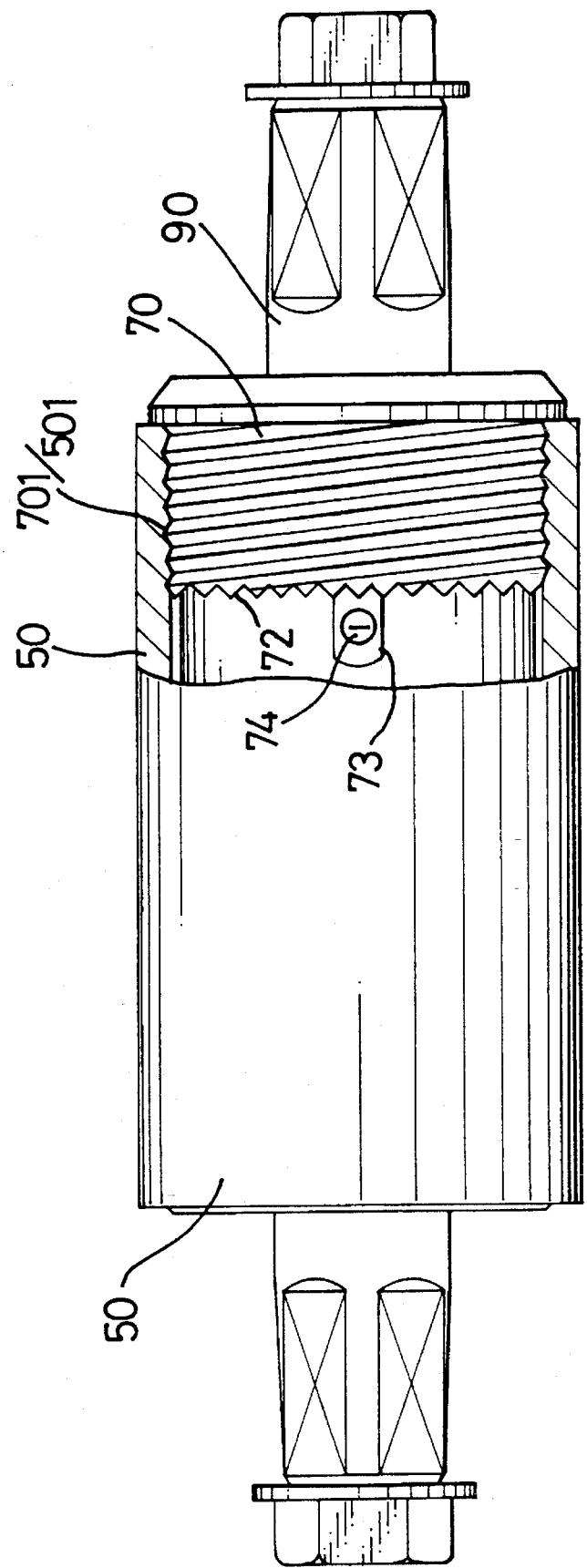
FIG. 3 is a top plane view, partly cut away, of the pedal crank bearing assembly in accordance with the present invention.

Referring to FIGS. 2 and 3, a pedal crank bearing assembly in accordance with the present invention generally includes a housing 50, a tube 60, first and second races 70, 71, two bearings 91, 92 and an axle 90. The housing 50 has thread portions 501, 502 defined in an inner periphery of both ends thereof. The tube 60 has first and second ends, the first end has a thread portion 601 defined in an outer periphery thereof and the second end thereof has a tapered surface. The first race 70 has a tubular part having inner and outer thread portion 701, 702 defined in an inner and outer periphery thereof respectively for engagement between the two thread portions 501, 601. The second race 71 has a thread portion 711 defined in an outer periphery thereof for engagement to the thread portion 502 of the housing 50 and a tapered surface formed in an inner periphery thereof for engagement to the tapered surface of the tube 60. The axle 90 having two annular recesses 901, 902 is rotatably engaged within the tube 60 by two bearings 91, 92 which are respectively disposed between the first race 70 and the annular recess 901, the tube 60 and the annular recess 902. Two seals 703, 712 are respectively disposed between the axle 90 and the first and second races 70, 71.

The first race 70 has a serrated face 72 defined at an end thereof and a stop 73 is fixed on an outer periphery of the tube 60 by a bolt 74, the stop 73 has a serrated edge for engagement to the serrated face 72 of the first race 70 for preventing the first race 70 from rotating such that the first race 70 is securely fixed by the engagement between the housing 50, the tube 60 and the stop 73 and these prevent the first race 70 from loosening.

Accordingly, the assembly has a high reliability of preventing the first race 70 from loosening and provides a convenient adjusting feature, a user only screws the second race 71 then the axle 90 and the tube 60 are moved toward to the first race 70 and then the user adjusts the bearing 91 for maintenance etc.

Although the invention has been explained in relation to its preferred embodiment, it is to be understood that many other possible modifications and variations can be made without departing from the spirit and scope of the invention as hereinafter claimed.

I claim:

1. A pedal crank bearing assembly for bicycles, comprising:

a housing, said housing having a thread portion defined in an inner side of both ends thereof;

at least one race, said race having an outer thread portion defined therein for engagement to said thread portion of said housing;

a tube engaging to said race, and an axle rotatably engaged within said tube by at least one bearing.

2. The pedal crank bearing assembly as claimed in claim 1 wherein said race has a serrated face defined at one end thereof.

3. The pedal crank bearing assembly as claimed in claim 2 wherein a stop is fixed on an outer periphery of said tube and engaged to said serrated face of said race.

4. The pedal crank bearing assembly as claimed in claim 1 wherein said race has an inner portion for receiving said bearing.

5. The pedal crank bearing assembly as claimed in claim 1 wherein said tube is threadedly engaged to said race.

6. A pedal crank bearing assembly for bicycles, comprising:

a housing, said housing having a thread portion defined in an inner side of both ends thereof;

at least one race, said race having an outer thread portion defined therein for engagement to said thread portion of said housing and having a threaded end defined in an end thereof;

a stop fixed on an outer periphery of said tube and engaged to said serrated face of said race, a tube engaging to said race, and an axle rotatably engaged within said tube by at least one bearing, 7. The pedal crank bearing assembly as claimed in claim 6 wherein said race has an inner portion for receiving said bearing.

8. The pedal crank bearing assembly as claimed in claim 6 wherein said tube is threadedly engaged to said race,

* * * * *